United States Patent
Ceskutti et al.

(10) Patent No.: US 8,867,746 B2
(45) Date of Patent: Oct. 21, 2014

(54) METHOD FOR PROTECTING A CONTROL DEVICE AGAINST MANIPULATION

(75) Inventors: Holger Ceskutti, Moeckmuehl (DE); Klaus Schneider, Ludwigsburg (DE); Ioannis Liakos, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1621 days.

(21) Appl. No.: 11/986,808

(22) Filed: Nov. 26, 2007

(65) Prior Publication Data

US 2008/0181407 A1   Jul. 31, 2008

(30) Foreign Application Priority Data

Nov. 27, 2006  (DE) .................. 10 2006 055 830

(51) Int. Cl.
   *H04L 9/00* (2006.01)
   *H04L 9/16* (2006.01)
(52) U.S. Cl.
   CPC ........................................ *H04L 9/16* (2013.01)
   USPC ............................................ 380/277; 726/34
(58) Field of Classification Search
   USPC ......... 380/277, 44, 28, 270; 341/50; 713/187, 713/194, 190; 711/114; 365/225, 145, 154; 716/1; 710/305
   See application file for complete search history.

(56) References Cited

U.S. PATENT DOCUMENTS

| | | | | |
|---|---|---|---|---|
| 5,191,608 A | * | 3/1993 | Geronimi | 713/187 |
| 5,559,889 A | * | 9/1996 | Easter et al. | 380/30 |
| 6,195,752 B1 | * | 2/2001 | Pfab | 713/168 |
| 2002/0061018 A1 | * | 5/2002 | Chien | 370/389 |
| 2006/0092049 A1 | * | 5/2006 | Dellow | 341/50 |

FOREIGN PATENT DOCUMENTS

DE     101 31 576     1/2003

OTHER PUBLICATIONS

Brian, Rogers; Memory Predecryption: Hiding the Latency Overhead of Memory Encryption; Year: 2004' IEEE; pp. 1-7.*

* cited by examiner

*Primary Examiner* — Philip Chea
*Assistant Examiner* — Monjour Rahim
(74) *Attorney, Agent, or Firm* — Kenyon & Kenyon LLP

(57) ABSTRACT

A method for protecting a control device against manipulation in which a number of set of keys for decoding cryptographic functions is provided, a key switch being additionally provided, via which the cryptographic functions access sets of keys.

20 Claims, 2 Drawing Sheets

METHOD FOR PROTECTING A CONTROL DEVICE AGAINST MANIPULATION

FIELD OF THE INVENTION

The present invention relates to a method for protecting a control device against manipulation, a method for executing cryptographic functions in a control device, and a control device for executing cryptographic functions.

BACKGROUND INFORMATION

Frequently, embedded systems are attacked in order to manipulate them, for example, in order to increase the performance of an internal combustion engine by exchanging programs or data. Algorithms and methods have therefore been developed to protect embedded systems (ES) from being manipulated by third parties unauthorized to do so. To this end, cryptographic functions, for example, that are based on symmetric or asymmetric sets of keys are implemented in digital circuits in order to increase security. The use of OTP (one-time programmable) and ROM memory areas or switches ("fuses") in digital circuits, such as, for example, microcontrollers, is also known.

A control device and method are described, for example, in German Patent No. DE 10131576. In the described microprocessor system and method, a check program is provided in a read-only memory, which check program is in a position to check the content of a rewritable memory for impermissible modifications. In the method, the central processing unit is first put in a position to carry out input and output operations that are necessary for the processing of instructions. After executing such a minimum program, or a boot routine of that kind, a code word, such as a check sum, is determined from at least a portion of the data in a rewritable memory.

A code word may be determined using more or less complicated mathematical encryption methods that do not permit an unauthorized person without exact knowledge of the encryption algorithm to determine the code word from the content of the rewritable memory.

Then the system compares the code word that was determined in this way to a comparison code word that is saved, for example, in the rewritable memory. If the code word and the comparison code word match each other, the program continues. If the code word and the comparison code word do not match, further operation of the microprocessor system is blocked. An authorized user who wants to modify the content of the rewritable memory thus determines, with the encryption algorithm that is known to him alone, a comparison code word from the program to be stored in the memory and then stores this in the memory. After executing the check program, the microprocessor system will then operate properly. An unauthorized modification of the memory content of the rewritable memory fails due to the fact that the encryption algorithm is not known, so that it is not possible to store a correct comparison code word in the rewritable memory. The check program recognizes that the code word and the comparison code word are different and blocks the microprocessor system from processing additional tasks.

SUMMARY OF THE INVENTION

The present invention relates to a method for protecting a control device from being manipulated in which a number of sets of keys is provided for decoding data via cryptographic functions, a key switch being additionally provided via which the cryptographic functions access sets of keys.

To increase security, the present invention thus provides that a key switch enables an assignment of cryptographic functions to corresponding sets of keys, the sets of keys being encapsulated and thereby protected against manipulation. The present invention thus makes it possible to hinder or prevent attacks on sets of keys that are in use.

Increasingly, for various reasons, digital circuits/microcontrollers provided with a low memory capacity or even having no program memory at all are being used in embedded systems (ES). In principle, systems having such digital circuits/microcontrollers have weak points from the perspective of protection against manipulation. For motor vehicles, the performance of an internal combustion engine, for example, could be increased by exchanging programs or data in a rewritable memory. This performance improvement through manipulation of the control program or the data may, however, result in an overloading of the internal combustion engine and ultimately even lead to a defect in the internal combustion engine.

Using the control device and the method of the present invention, it is possible to implement a secured but still configurable key storage in an ES and thereby to increase the protection against manipulation.

The present invention also relates to a method for executing cryptographic functions in a control device in which the cryptographic functions use assigned sets of keys to decode data, the assignment of the cryptographic functions to the assigned set of keys in each instance being performed via a provided key switch.

The present invention furthermore relates to a control device, which has a first memory area for recording sets of keys for decoding data. The control device has a second memory area for recording a key switch that enables an assignment of cryptographic functions to corresponding sets of keys.

In the control device and method according to the present invention, the sets of keys are encapsulated and thereby protected against manipulation. It is possible to configure various sets of keys for different applications. For reasons of manipulation protection, this configuration is allowed only once, for example, in the production of the ES. To encapsulate the sets of keys, the control device of the present invention has a key switch that enables an assignment of cryptographic functions to corresponding sets of keys.

The key switch is stored in an OTP memory area so that the key switch may no longer be modified. The key switch makes it possible, depending on the programmed configuration of the sets of keys (for example, through OTP memory cells, so-called "fuses"), to refer to different memory locations when accessing the key array.

A ROM key memory area may be populated only by the manufacturer of the digital circuit/microcontroller. Typically, multiple memory locations as well as one identification exist.

An internal or external program memory may, among other things, include the cryptographic functions that access the sets of keys via the key switch. To increase protection, these may be stored in the internal flash and, in the ideal case, be stored there in a ROM.

Each cryptographic function may access the sets of keys transparently via the key switches. Different sets of keys are provided in order to be able to configure another sentence, for example, in the case of a compromised set of keys, without having to modify the ROM of the key memory.

The position of the key switch is set in the OTP key configuration, for example, during the production of the ES, and after this can never again be modified (for example, by an attacker).

The cryptographic functions check, via the existence of the key switch as well as the identification information in the key array or the key field, whether the digital circuit/microcontroller even offers this feature in the correct version. If not, then the suspicion exists that an attacker exchanged the digital circuit/microcontroller with a module not having these functions or for another (old) set of keys.

The present invention furthermore relates to a computer program having program code means for executing one of the described methods, and a computer program product having these code means stored on a computer-readable medium.

DETAILED DESCRIPTION

Figure 1:
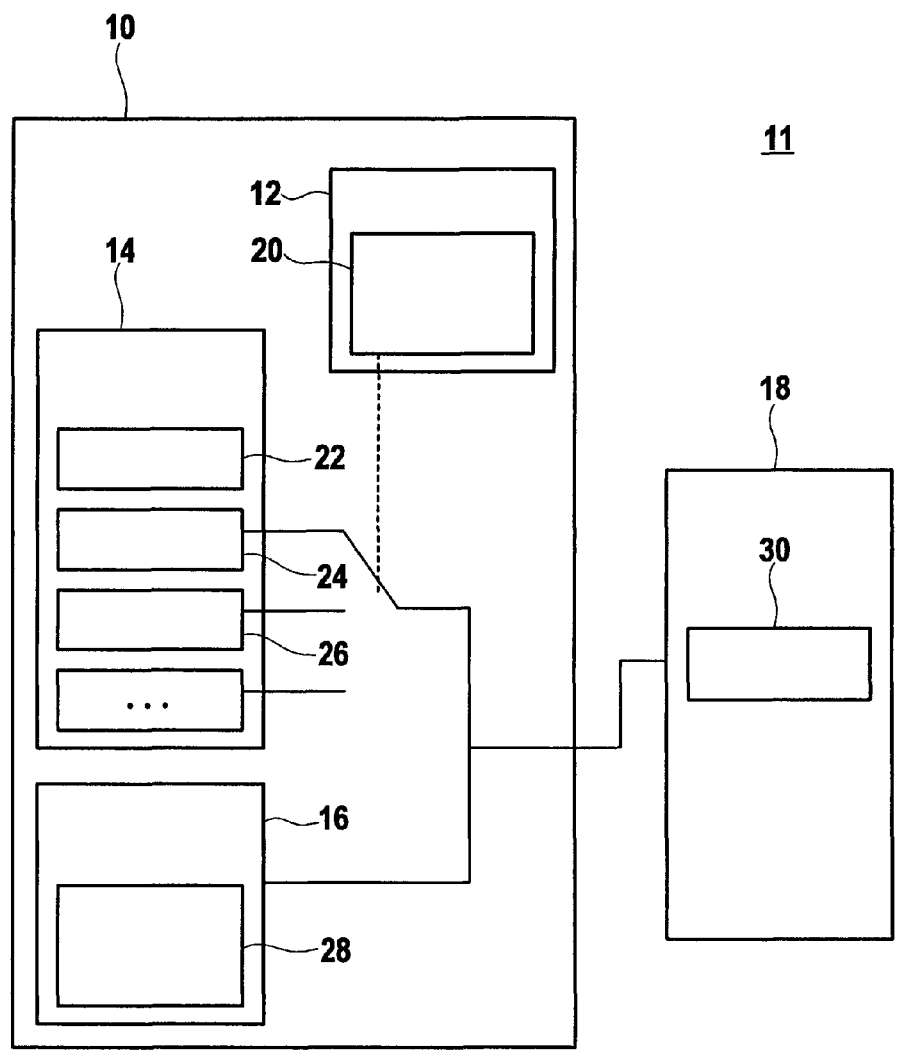
FIG. 1 shows a schematic representation of a control device according to the present invention in accordance with a preferred specific embodiment.

FIG. 1 shows a control device 11, which includes a digital circuit/microcontroller 10, a key switch 12, a key memory 14, and an internal program memory 16. An external memory area 18 is additionally shown. In different specific embodiments of the present invention, control device 10 has an internal or external program memory 16, 18 or an internal and external program memory 16, 18.

Key memory 14 is a ROM memory area. Different sets of keys 24, 26 are stored in this memory area 14. A piece of identification information 22 also exists.

ROM key memory area 14 may be populated only by the manufacturer of control device 10, so that sets of keys 24, 26 may no longer be manipulated at a later point in time. It is possible to configure different sets of keys 24, 26 for different applications. Different sets of keys 24, 26 are provided in order to be able to configure another key, for example, in the case of a compromised set of keys 24, 26, without having to modify the ROM of key memory 14.

Key switch 12 enables an assignment of cryptographic functions to corresponding sets of keys 24, 26 and may be stored in an OTP memory area so that it may not be manipulated. Depending on the programmed configuration of sets of keys 24, 26, key switch 12 makes it possible to refer to different memory locations when accessing the key array.

Internal and external program memories 16, 18 include among other things cryptographic functions 28, 30, which access sets of keys 24, 26 via key switch 12. To increase protection, these may be located in the flash, and in the ideal case, be located there as ROM.

Each cryptographic function 28, 30 may transparently access sets of keys 24, 26 via key switch 12, in order to decode the cryptographic functions 28, 30.

Cryptographic functions 28, 30 check, via the existence of key switch 12 as well as identification information 22 in the key array, whether control device 10 even offers this feature or characteristic in the correct version. If not, then the suspicion exists that an attacker exchanged control device 10 with a module not having these functions or having other (old) sets of keys.

Figure 2:
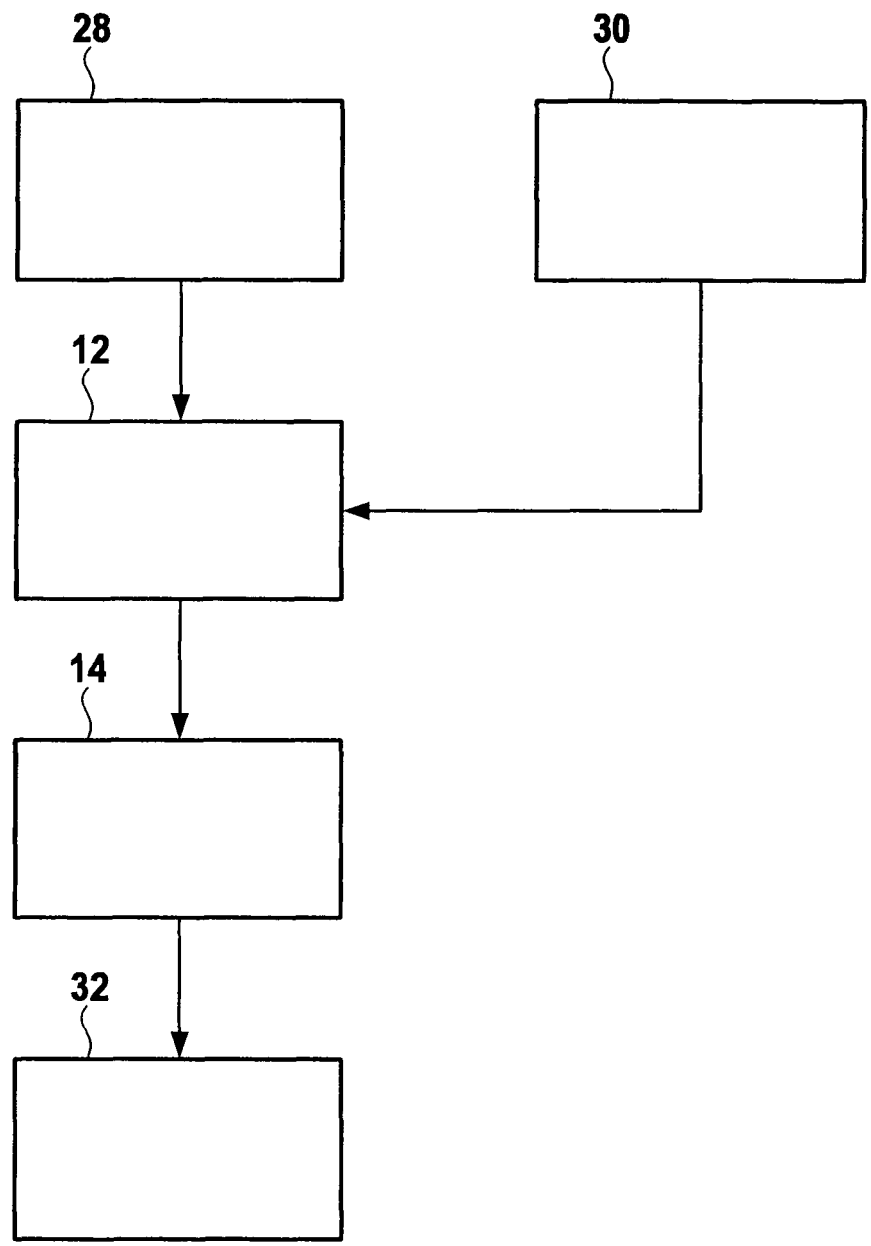
FIG. 2 shows a method according to the present invention in accordance with a preferred specific embodiment in a flow chart.

FIG. 2 shows a method in which for the execution of a cryptographic function in a control device, cryptographic function 28 and/or 30 first decodes data 32 using assigned set of keys 14, the assignment of cryptographic functions 28, 30 to the assigned sets of keys taking place via a provided key switch 12.

Cryptographic function 28 may be stored in an internal ROM/OTP/Flash or RAM program memory. To increase protection, these are located in the internal flash, and in the ideal case, are located there as ROM.

Cryptographic function 30 may also be stored in an external program memory. In this example, an OTP memory area is provided for recording key switch 12.

What is claimed is:

1. A computer-implemented method for protecting a control device against manipulation, comprising:
  reading, by a processor, via a key switch a respective different one of sets of keys;
  assigning, by the processor, the different cryptographic functions each to the respective different one of the assigned sets of keys; and
  executing, by the processor, the different cryptographic functions each based on the one of the assigned sets of keys to decode data,
  wherein: an access to the sets of keys is encapsulated by the key switch,
  the key switch permanently assigns the cryptographic functions to their respective assigned keys, and the key switch is recorded in a first memory device that is physically separate from a second memory device in which the sets of keys are recorded,
  wherein: the key switch is set in the first memory device during a production of the control device and is not modifiable thereafter the first memory device is an OTP memory in which the key switch is set by fusing memory cells, and the second memory device is a ROM.

2. The method according to claim 1, further comprising:
  providing the first memory device with an OTP memory area for recording the key switch.

3. The method according to claim 1, further comprising:
  providing an internal program memory for recording the cryptographic functions.

4. The method according to claim 1, further comprising:
  providing an external program memory for storing the cryptographic functions.

5. A computer-implemented method for executing cryptographic functions in a control device, comprising:
  reading, by a processor, sets of keys via a key switch for an assignment of the cryptographic functions to the sets of keys in each instance; and
  executing, by the processor, the cryptographic functions based on the assigned sets of keys to decode data,
  wherein: an access to the sets of keys is encapsulated by the key switch, the key switch permanently assigns the cryptographic functions to their respective assigned keys, and the key switch is recorded in a first memory device that is physically separate from a second memory device in which the sets of keys are recorded,
  wherein: the key switch is set in the first memory device during a production of the control device and is not modifiable thereafter the first memory device is an OTP memory in which the key switch is set by fusing memory cells, and the second memory device is a ROM.

6. The method according to claim 5, further comprising:
  providing the first memory device with an OTP memory area for recording the key switch.

7. The method according to claim 5, further comprising:
  providing an internal program memory for recording the cryptographic functions.

8. The method according to claim 5, further comprising:
providing an external program memory for storing the cryptographic functions.

9. A control device for executing cryptographic functions, comprising: a first read-only memory area for recording sets of keys for decoding data; and
a second memory area for recording a key switch, which enables an assignment of different cryptographic functions each to a respective one of the sets of keys,
wherein: an access to the sets of keys is encapsulated by the key switch, the key switch permanently assigns the cryptographic functions to their respective assigned keys, and the first read-only memory area is located in a first memory device that is physically separate from a second memory device in which the second memory area is located,
wherein: the key switch is set in the first memory device during a production of the control device and is not modifiable thereafter the first memory device is an OTP memory in which the key switch is set by fusing memory cells, and the second memory device is a ROM.

10. The control device according to claim 9, wherein the second memory area is an OTP memory area.

11. The control device according to claim 9, further comprising:
an internal program memory for recording the cryptographic functions.

12. The control device according to claim 9, further comprising:
an external program memory for storing the cryptographic functions.

13. A non-transitory computer-readable medium having a computer program, which is executable by a processor, comprising:
a program code arrangement having program code for protecting a control device against manipulation by performing the following:
reading, by a processor, via a key switch a respective different one of sets of keys;
assigning, by the processor, the different cryptographic functions each to the respective different one of the assigned sets of keys; and
executing, by the processor, the different cryptographic functions each based on the one of the assigned sets of keys to decode data,
wherein: an access to the sets of keys is encapsulated by the key switch, the key switch permanently assigns the cryptographic functions to their respective assigned keys, and the key switch is recorded in a first memory device that is physically separate from a second memory device in which the sets of keys are recorded,
wherein: the key switch is set in the first memory device during a production of the control device and is not modifiable thereafter the first memory device is an OTP memory in which the key switch is set by fusing memory cells, and the second memory device is a ROM.

14. The method according to claim 1, further comprising:
providing the first memory device with an OTP memory area for recording the key switch;
providing an internal program memory for recording the cryptographic functions; and
providing an external program memory for storing the cryptographic functions.

15. The method according to claim 5, further comprising:
providing the first memory device with an OTP memory area for recording the key switch;
providing an internal program memory for recording the cryptographic functions; and
providing an external program memory for storing the cryptographic functions.

16. The control device according to claim 9, further comprising:
an internal program memory for recording the cryptographic functions; and
an external program memory for storing the cryptographic functions;
wherein the second memory area is an OTP memory area.

17. The control device according to claim 16, wherein:
the key switch is set in the first memory device during a production of the control device and is not modifiable thereafter,
the first memory device is an OTP memory in which the key switch is set by fusing memory cells, and
the second memory device is a ROM.

18. The method according to claim 1, further comprising:
executing, by the processor, the cryptographic functions, which cause the processor to condition the decoding upon the processor determining that each of the following is true:
the key switch exists in the first memory device, and
the keys in the second memory device match keys to which the cryptographic functions have been assigned by the key switch.

19. The method according to claim 5, further comprising:
executing, by the processor, the cryptographic functions, which cause the processor to condition the decoding upon the processor determining that each of the following is true:
the key switch exists in the first memory device, and
the keys in the second memory device match keys to which the cryptographic functions have been assigned by the key switch.

20. The device according to claim 9, wherein the cryptographic functions cause the processor to condition the decoding upon the processor determining that each of the following is true:
the key switch exists in the second memory device, and
the keys in the first memory device match keys to which the cryptographic functions have been assigned by the key switch.

* * * * *